United States Patent
Simonsson et al.

(10) Patent No.: US 7,554,998 B2
(45) Date of Patent: Jun. 30, 2009

(54) INTERFERENCE-BASED ROUTING IN A WIRELESS MESH NETWORK

(75) Inventors: Arne Simonsson, Gammelstad (SE); Jonas Pettersson, Luleå (SE)

(73) Assignee: Telefonaktiebolaget LM Ericsson (publ), Stockholm (CH)

( * ) Notice: Subject to any disclaimer, the term of this patent is extended or adjusted under 35 U.S.C. 154(b) by 794 days.

(21) Appl. No.: 11/032,237

(22) Filed: Jan. 11, 2005

(65) Prior Publication Data

US 2006/0153081 A1    Jul. 13, 2006

(51) Int. Cl.
*H04L 12/407*    (2006.01)
(52) U.S. Cl. ....................... 370/406; 370/252
(58) Field of Classification Search ................. 370/238; 709/241
See application file for complete search history.

(56) References Cited

U.S. PATENT DOCUMENTS

| 7,215,928 B2 * | 5/2007 | Gage et al. .................. 455/63.1 |
| 2002/0013856 A1 | 1/2002 | Garcia-Luna-Aceves et al. |
| 2007/0082616 A1 * | 4/2007 | Bird ............................ 455/63.1 |

OTHER PUBLICATIONS

Tomas Krag and Sebastian Buettrich, "Wireless Mesh Networking" O'Reilly Wireless 2004.
IETF-standard, OSPF version 2, RFC 2328.
Cisco white paper, "OSPF Design Guide", Document ID: 7039.
Tsudaka et al, "Power Control Routing for Multi Hop Wireless Ad-hoc Network", IEEE Symposium on Ad Hoc Mobile Wireless Networks, 2001.
A. Simonsson, M. Almgren & M. Thurfjell, "A Power Control and Scheduling Concept for EGPRS", VTC2000 Fall.
M. Sherman, "On the Need for Efficiency in the 802.11 QoS Solution", IEEE 802.11-10/045 Jan. 2001.
Doshi et al, "An On-demand Minimum Energy Routing Protocol for a Wireless Ad Hoc Network".
E. Royer & C-K Toh, "A Review of Current Routing Protocols for Ad Hoc Mobile Wireless Networks", IEEE Personal Communications, Apr. 1999, pp. 46-55.
Masaharu Hata, "Empirical Formula for Propagation Loss in Land Mobile Radio Services", IEEE Transactions on Vehicular Technology, vol. VT-29, No. 3, Aug. 1980.
Haenggi, Routing in Ad Hoc Networks-A Wireless Perspective Conference Proceedings, Broadband Networks, 2004.
Wang et al., "Interference-aware QoS multipath routings for ad hoc wireless network'," Conference Proceedings Article, Distributed Computing Systems Workshops, 2004.
Pursley et al., "Energy-Efficient Routing in multimedia ad hoc networks'," Conference Proceedings Article, Wireless Communications and Networking Conference, 2004.

* cited by examiner

*Primary Examiner*—Ricky Ngo
*Assistant Examiner*—Ben H Liu
(74) *Attorney, Agent, or Firm*—Nixon & Vanderhye P.C.

(57) ABSTRACT

Route selection through a wireless mesh network between a source node and a destination node is based on minimizing generated interference in order to increase the capacity of the network. An interference energy associated with transmitting a packet over each hop in multiple routes from the source node to the destination node is determined. The interference energy for each hop is combined to generate a combined interference energy for each route. One of the routes is selected based on the combined interference energy determined for each route.

29 Claims, 4 Drawing Sheets

IA = Interference Area

INTERFERENCE-BASED ROUTING IN A WIRELESS MESH NETWORK

TECHNICAL FIELD

The technical field relates generally to wireless communications, and more particularly, to selecting a route through a wireless mesh network.

BACKGROUND AND SUMMARY

Wireless networks have become increasingly important and popular because mobility is supported along with many of the sophisticated applications offered by fixed wired networks. Wireless networks include traditional cellular networks with radio base stations coupled to a radio network infrastructure. A mobile terminal communicates with one or more base stations within range, and as the mobile moves out of range, a handover procedure to another base station may be performed to maintain continuous communication. Another type of wireless network is a mesh network. A mesh network handles many-to-many connections and is capable of dynamically optimizing these connections.

Wireless mesh networks are commonly known as wireless "ad hoc" networks that usually consist of mobile, battery-operated computing devices that communicate over a wireless medium. The network does not rely on fixed routers, and all of the nodes are capable of movement and can be connected dynamically in an arbitrary manner. Each node functions as a router that discovers and maintains routes to other nodes in the ad hoc network. A route is the path used to deliver one or more packets between a source node and a destination node. The route may contain one or more "hops." A hop corresponds to a direct transmission from one node to another node without any intervening nodes. Examples of wireless technologies with ad hoc capability include IEEE 802.11 wireless local area networks (WLANs) and Bluetooth personal area networks (PANs).

Two types of routing protocols are generally employed in wireless mesh networks: table-driven routing protocols and source-initiated, on-demand routing protocols. Table-driven routing protocols attempt to maintain consistent, up-to-date routing information from each node to every other node in the network via periodic updates from all the other nodes in the network, irrespective of the fact that the network may not be active in terms of data traffic. For the on-demand approach, a request for routes to a destination is sent only if the source node has data packets to be sent to that destination node. Example table-driven ad hoc routing protocols include open shortest path first (OSPF) routing, destination-sequenced distance-vector routing, clusterhead gateway switch routing, and wireless routing protocol. Examples of source-initiated, on-demand routing include ad hoc on-demand distance vector routing or dynamic source routing, temporary order routing, associativity-based routing, and signal stability routing.

In open shortest path first (OSPF) routing, each wireless node maintains an identical database describing the network topology. From this database, a routing table is calculated by constructing a shortest path tree. The shortest path is that with the lowest cumulative "cost." For a radio link or hop, the "cost" may be measured as the inverse of the expected data rate over that radio hop. As a result, low data rates are high cost because they result in longer times to transmit packets. OSPF was initially designed for fixed networks, but wireless routing protocol (WRP) and dynamic source routing (DSR) are similar in their route selection approach for wireless networks.

Wireless ad hoc networks must deal with certain limitations associated with the wireless communications medium including power/interference limitations, low bandwidth, and high error rates. Because wireless network nodes are typically battery-operated and because the capacity of a radio communications network is limited by the shared spectrum, routing protocols that attempt to find minimum energy routing path are of particular interest. Energy efficient routing schemes can greatly reduce energy consumption at the nodes, leading to longer battery life, as well as improve the network capacity by reducing the interference in the network. Table-driven routing schemes are generally more expensive in terms of energy consumption as compared to on-demand schemes because of the large overhead required to maintain the various tables. But minimum energy routing techniques should not only be focused on battery saving of the mobile nodes. Such routing algorithms should also try to improve network capacity.

Most wireless ad-hoc networks, and particular those that employ IEEE 801.11, share a radio frequency in time, and the same frequency is used both to transmit and receive. To coordinate using the shared frequency medium, some sort of protocol is employed. For example, carrier sense multiple access with collision avoidance (CSMA/CA) requires that a node wanting to transmit a packet must "listen" to ensure that no other node is transmitting. If the channel is clear for a certain time period, the node can transmit the packet directly; otherwise, the node sets a random "back off" timer. When the timer expires, the node transmits. A clear channel assessment (CCA) function may be employed to determine whether the common frequency is available. A CCA function usually includes both carrier sensing and energy detection. If either is triggered, the common frequency is considered busy. Carrier sensing is triggered when a receiver is able to detect another node's transmitted signal. The energy detection mechanism is triggered when the total received energy (regardless of the source) is above a threshold.

The inventors recognized that there are several factors that must be considered to obtain an optimal energy routing scheme. First, it is important to reduce the number of nodes refraining from transmitting over the common frequency due to a busy indication, e.g., a clear channel assessment (CCA) busy indication. Second, it is also important to reduce the length of time that each node must wait before it can transmit over the common channel. Although selecting the shortest length path as the shortest time delay path may improve battery saving, it may not optimize the network capacity. Wireless networks are interference limited. Transmission power is in most scenarios not equal to the interference caused by a particular transmission at a particular power. Indeed, nodes may be affected by transmission-based interference even if they are not within range/communication distance of the transmitting node, i.e., the nodes are still within interference distance.

A third consideration is the specific transmission conditions for the next hop transmission. For example, based on current radio conditions, the node will select a particular modulation and coding scheme for the transmission that adapts to those current conditions. That modulation and coding scheme establish the data transmission rate which should preferably be accounted for to estimate the node's transmission time and transmission energy over the next hop.

Another important factor to consider is the amount of signaling between nodes in order to keep each node updated with current conditions. Such signaling updates, particularly if frequently transmitted, drain the power of the battery-operated nodes and increase the interference in the network. It would be desirable to eliminate or at least to decrease such status update messages generated by each node in the mesh network.

The inventors further recognized that simply estimating the energy that would be used by a particular node for transmission of one hop for a packet, where energy is defined in terms of power and time, does not take into account the realities of typical ad hoc networks. Real wireless networks must deal with obstacles (buildings, walls, natural objects, weather, etc.) that cause propagation loss. So transmission energy is not an adequate measurement of the caused interference.

Accordingly, interference energy is estimated for each potential hop transmission along various routes from the source node to the destination node using an interference energy model that accounts for the factors described above. The determined interference energy for each hop is combined to produce a combined interference energy for each route. One of the routes is selected based on the combined interference energy for each route. For example, combining interference energies may include summing the interference energies, and the one route having the lowest summed interference energy may be selected.

In one non-limiting example embodiment, a transmission time associated with transmitting the packet over each hop in each of multiple routes from the source node to the destination node is determined. For each of the hops, a number of nodes that would be affected by interference produced by transmitting the packet over that hop is determined. The transmission time and the number of affected nodes for each hop are combined to produce a corresponding hop result. The hop results for each route are combined, and the one route is selected based on those combined results. For example, the transmission time and number of nodes may be multiplied and the results summed so that the one route is selected having a lowest summed result.

The transmission time preferably (though not necessarily) takes into account one or more of the following: a size of the packet, an overhead associated with sending the packet, a bit rate associated with transmitting the packet over the hop (likely determined based on current radio-related conditions for the hop), and a re-transmission probability associated with transmitting over the hop. The number of affected nodes may be estimated based on a power level at which the packet would be transmitted over the hop, a receiver threshold at which the interference is affecting other nodes, and a propagation function that translates the power level to a caused interference affecting one or more surrounding nodes. If desired, a probability that another node having data to transmit during the transmission time will actually be affected by the packet transmission may also be taken into account.

Information used to determine an interference energy associated with one or more hops may be obtained from transmissions from other nodes. Such information may also be obtained by monitoring communications between other nodes. Alternatively, it may be useful for each node to distribute determined hop interference energies among the other nodes in the mesh network.

BRIEF DESCRIPTION OF THE DRAWINGS

The foregoing and other objects, features, and advantages may be more readily understood with reference to the following description taken in conjunction with the accompanying drawings.

DETAILED DESCRIPTION

In the following description, for purposes of explanation and not limitation, specific details are set forth, such as particular components, electronic circuitry, techniques, protocols, standards, etc. in order to provide an understanding of the described technology. For example, one advantageous application is to wireless local area networks that follow the IEEE 802.11 standard. But other standards and other types of network are also applicable, e.g., Bluetooth PANs. Further, it will be apparent to one skilled in the art that other embodiments may be practiced apart from the specific details. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using application specific integrated circuitry (ASIC), and/or using one or more digital signal processors (DSPs).

Figure 1:
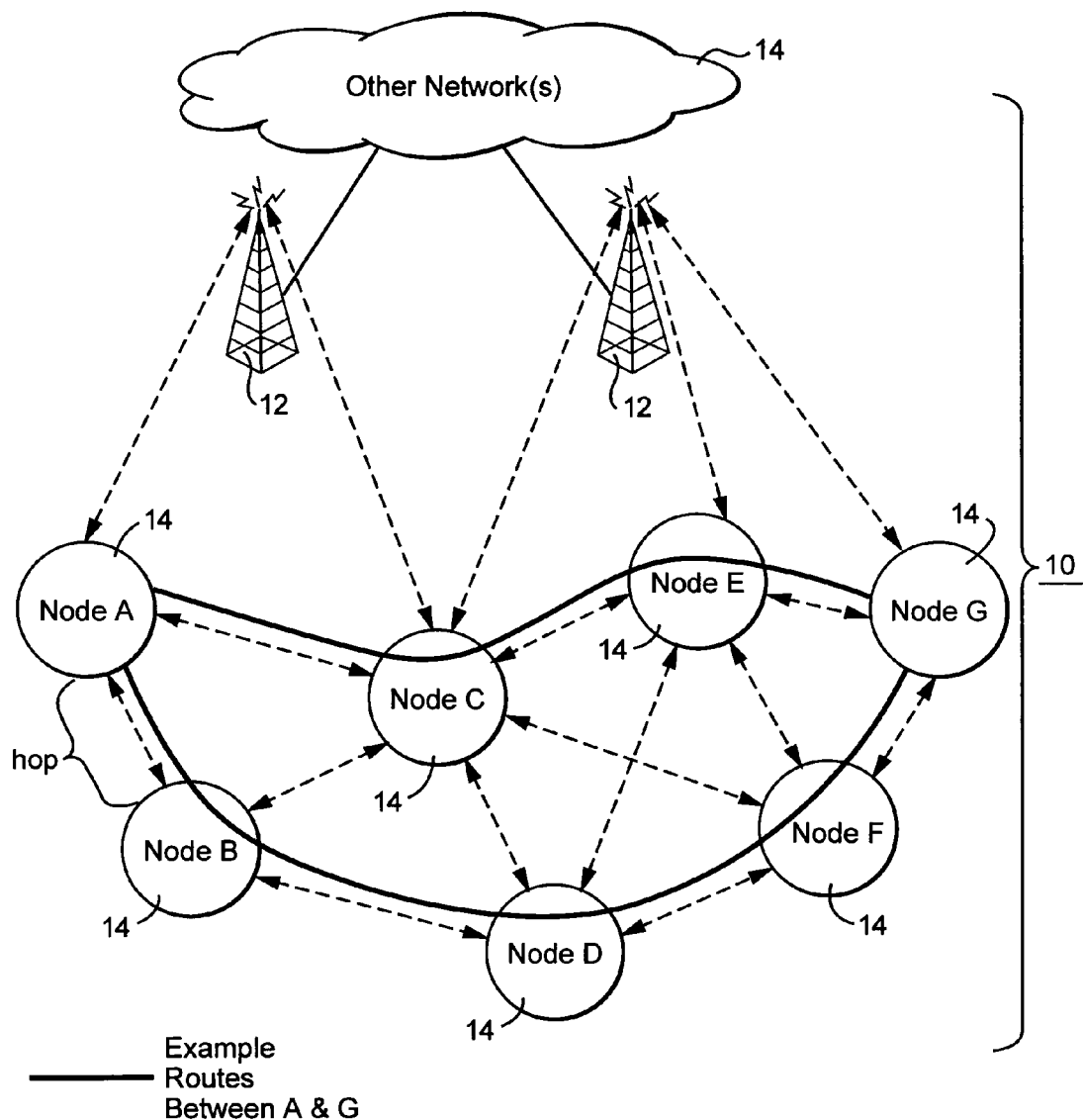
FIG. 1 is a network diagram illustrating an example of a mesh network.

FIG. 1 shows a wireless mesh network 10 that includes one or more fixed wireless base station nodes 12 coupled to one or more other networks 14 as well as multiple mobile wireless nodes 14. The mobile nodes 14 communicate with the base stations 12 and with each other (either via the base station or directly) over a wireless interface. Each hop between adjacent nodes is represented using dashed lines. An example, non-limiting protocol for the wireless communications is IEEE 802.11b, which is currently the most commonly used wireless local area network (WLAN) communications standard. Each node 14 communicates with nodes that are within radio frequency communication range using the same radio frequency channel(s) for transmission and reception. As described in the background, various protocols may be used to avoid and resolve collisions as packets are transmitted over that common communications medium, e.g., CCA, etc. Because the radio communications medium is a limited resource, it is critical that it be used efficiently so that the network capacity is used optimally. It is also important that the wireless nodes 14, which are typically battery-operated, conserve battery power.

These and other objectives can be met by selecting an optimal route by which to transmit a packet from a source node to a destination node through the wireless mesh network. FIG. 1 illustrates two example routes from source node A to destination node G. A first possible route follows nodes A, C, E and G. A second possible route follows nodes A, B, D, F and G. Of course, there are many other possible routes that could be employed to deliver a packet from node A to node G.

It is advantageous to base route selection through a wireless mesh network in order to minimize an affect the generated or caused interference associated with that route would have on the other nodes in the network. In this way, total capacity in the network can be increased as well as battery power conserved in the wireless nodes 14. Interference energy is used as a measure to determine which hops and which route (each route including one or more node hops to communicate a packet from the source node to the destination node) is more or less desirable in terms of the interference impact it has on the other nodes in the network, i.e., "caused interference." FIG. 2 helps illustrate this point. Three nodes A, B and C are shown with node A transmitting at four different power levels P1, P2, P3, and P4. Each power level has a corresponding interference area (IA). With increasing transmission power, the interference area impact increases in size, i.e., the caused interference is larger.

Figure 2:
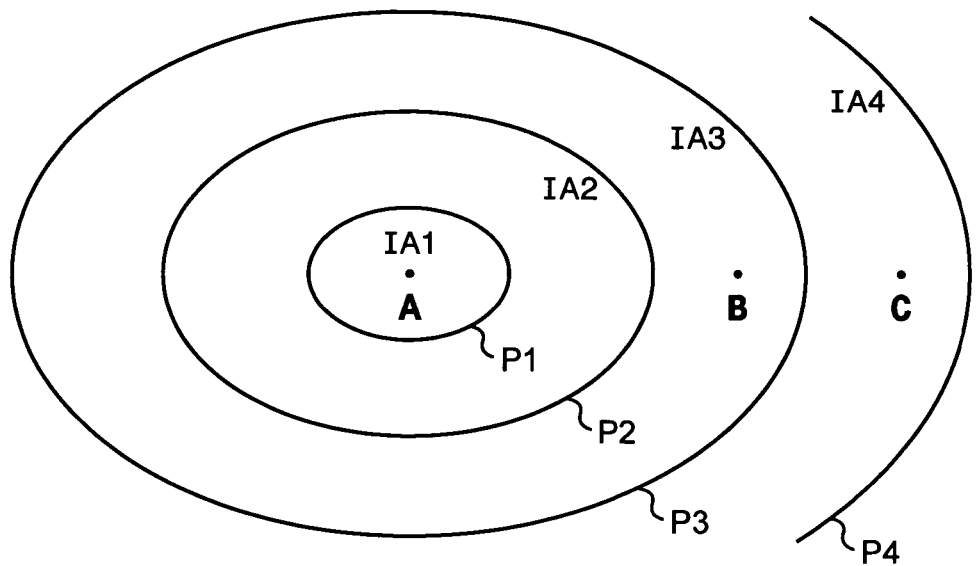
FIG. 2 is a diagram which illustrates the concept of an interference area.

In general, higher power levels mean higher energy and an increased probability of creating interference for the other nodes. But power and number of affected nodes are usually not linearly related. For example, reducing the transmit power of a mobile by a certain amount will likely not reduce the number of interfered nodes by that same amount. As illustrated in FIG. 2, reducing the power from P3 to P2 will reduce the number of affected nodes from one affected node B to zero affected nodes. Reducing the power further to P1 will not have any effect. The inventors determined that when nodes are evenly distributed, the possibility of one node's transmission interfering with another node's transmission is related to the interference area associated with that node transmission.

The interference area is the area where the resulting interference level is above a predefined interference threshold. It can be estimated as the square of an interference distance $r_i$ (possibly multiplied with a geometric constant such as $\pi$), where $r_i$ is the largest distance at which the interference level is above a defined threshold $I_{thresh}$. For IEEE 802.11, the interference threshold can be selected as the CCA detection level, which is the lower of an energy detection threshold and a carrier sensing level where transmission is inhibited. Based on transmitted power P measured in linear units (Watts) and a commonly-used, exponential radio propagation function:

$$G(r) = g_1 \cdot r^{-\alpha} \qquad \text{(linear units)}$$

where $g_1$ and $\alpha$ are parameters that depend on the environment and which describes path gain as a function of distance, the interference distance $r_i$ can be computed as:

$$r_i = G^{-1}\left(\frac{I_{thresh}}{P}\right)$$

where $G^{-1}$ is the inverse of the propagation function.

Figure 3:
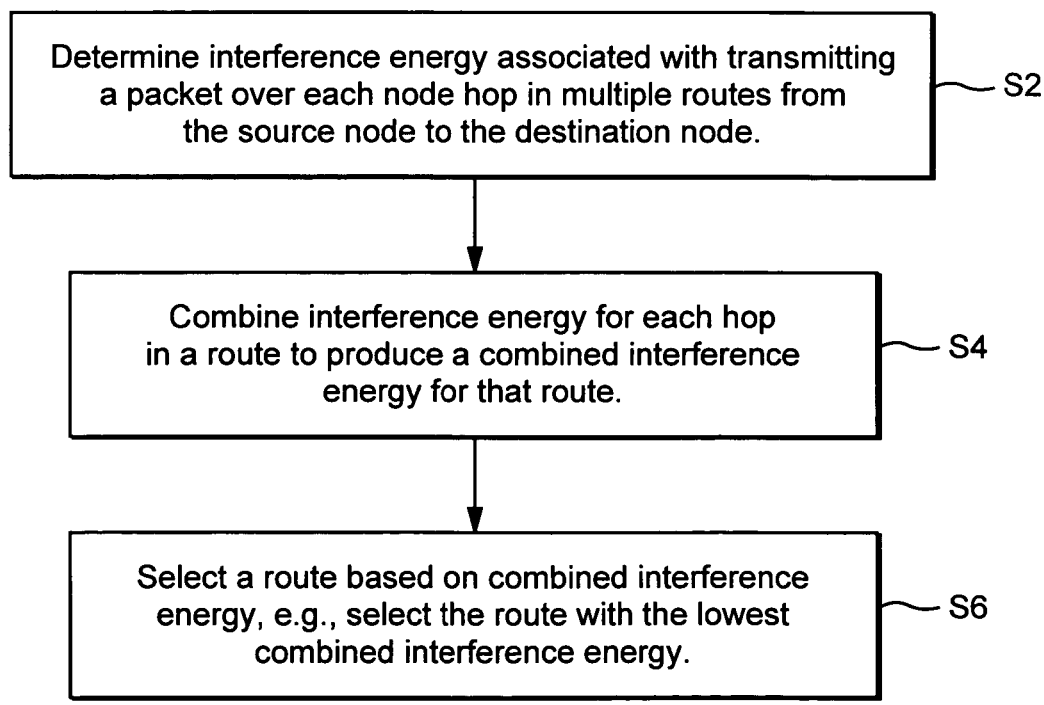
FIG. 3 is a flow chart diagram illustrating procedures in accordance with one example embodiment.

Reference is now made to the flow chart diagram in FIG. 3 which outlines example procedures in accordance with one non-limiting embodiment. The interference energy associated with transmitting a packet over each node hop in each of multiple routes from a source node to a destination node is determined (step S2). The interference energy for each hop in a route is combined to produce a combined interference energy for that route (step S4). The route over which the packet is then sent is selected based on the combined interference energy for each route (step S6). For example, the route may be selected that has the lowest combined interference energy.

Figure 4:
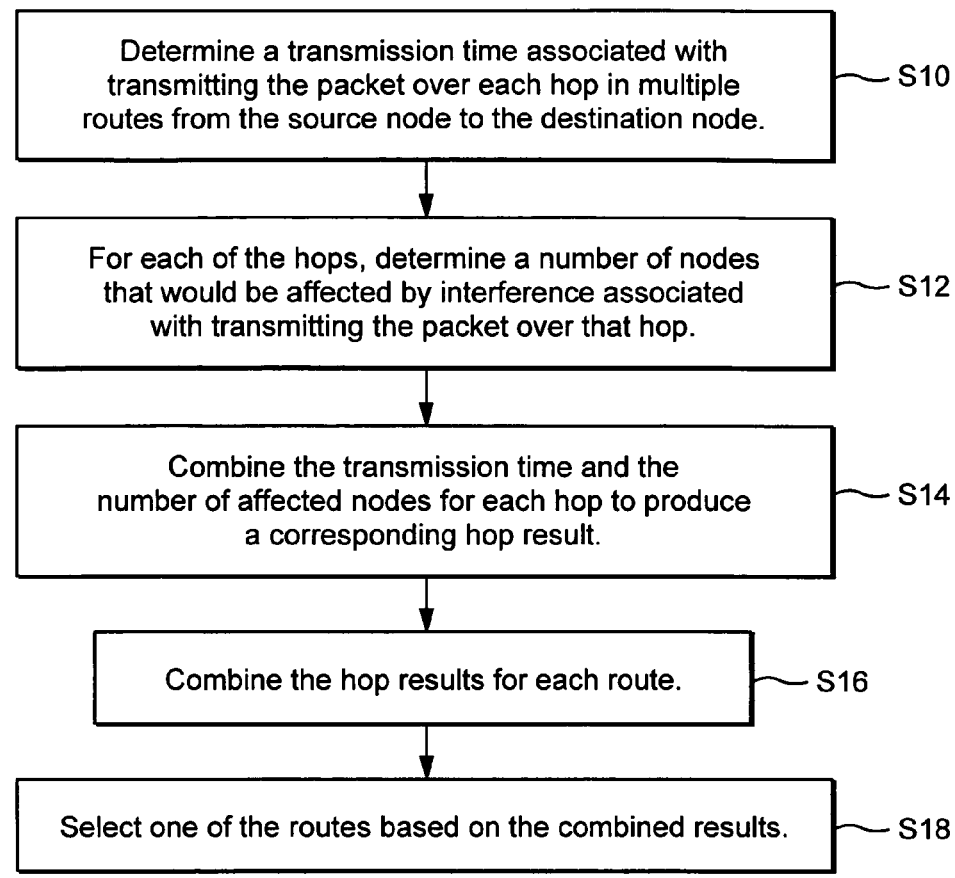
FIG. 4 is a flow chart diagram illustrating procedures in accordance with another example embodiment.

The following is an example, non-limiting implementation described in conjunction with the flow chart in FIG. 4. Each node determines a transmission time associated with transmitting a packet over each hop in multiple routes from the source node to the destination node (step S10). For each of the hops, a number of nodes is determined that would be affected by the interference associated with transmitting a packet over that hop (step S12). The transmission time and the number of affected nodes for each hop is combined to produce a corresponding hop result (step S14). The hop results for each route are combined (step S16). One of the routes is then selected based on the combined results (step S18).

One way to determine the transmission time U for a packet with size D can be estimated as:

$$U = \frac{D + OH_{L1}}{R_{L1} \cdot (1 - BLER)} \cdot N_{CH}$$

$OH_{L1}$ is the overhead associated with sending the packet including, for example, the packet header and the like. $N_{CH}$ is the number of frequency channels used for the transmission. According to the IEEE 802.11 standard, there is only one such frequency channel used, but there are solutions where transmission is performed on several channels, e.g., two 20 MHz carriers. A varying number of OFDM sub-carriers may also be used. $R_{L1}$ corresponds to an assigned bit rate for transmission from the node based on the radio link modulation and coding scheme selected by the node which in turn is based on current radio conditions over a particular hop. The block error rate (BLER) rate is determined by the node based upon the number of packet acknowledgements and/or negative acknowledgments received for prior packet transmissions. The transmission time U is measured in seconds.

The number of nodes that would be affected by interference associated with transmitting the packet over a particular hop may be estimated in accordance with the following by assuming the commonly-used, exponential radio propagation function:

$$G(r) = g_1 \cdot r^{-\alpha} \qquad \text{(linear units)}$$

where $g_i$ and $\alpha$ are parameters that depend on the environment. The resulting interference area is proportional to $P^{2/\alpha}$, where P is the power level measured in Watts at which the packet would be transmitted over the hop. The transmit power P from an IEEE 802.11 node is typically fixed, e.g, 100 mW, and therefore is known by the node. Also, in the case of a power-controlled transmission with variable power, the power is known by the transmitting node. The propagation factor $\alpha$ is set in accordance with the radio signal propagation environment of the hop and may either be set by a user manually, by a control node that communicates $\alpha$ values to various nodes, or by the node making various measurements of the environment to estimate $\alpha$. Other techniques may be used as well.

In some cases, such as power-controlled transmission, it is more convenient to express the transmission power P in logarithmic units, such as dBW. The expression above for number of affected nodes is then:

$$10^{\left(\frac{2}{10\alpha} P_{dB}\right)}$$

When estimating the interference area, the transmission power P can be measured in dB above the desired interference threshold, for example, the IEEE 802.11 CCA detection level. In one example, $\alpha$ may be determined using propagation constant B described in the Okumura-Hata model which describes an empirical formula for propagation loss in land mobile radio service. The above-described equations are based on the commonly-used exponential radio propagation model. But any other propagation model can be used such as linear propagation and breakpoint models, (e.g., Keenan-Motley).

Within one mesh network, different functions (and parameter settings such as α) can be mixed. Each node can use the function that best represents the surrounding radio environment. Factory default selections can be set for typical environments for the equipment, e.g., closed office, semi-open office, open office, outdoor, etc.

The interference energy W is then determined in accordance with the following:

$$W = U \cdot P^{2/\alpha}$$

where P is measured in Watts, U is determined in accordance with the equation set forth above, and W is measured in Watt-seconds. If desired, the interference for a packet transfer over one hop can be further multiplied with an estimate of the probability $P_{jam}$ that this interference actually delays transmissions from the disturbed nodes:

$$W = U \cdot P^{2/\alpha} \cdot P_{jam}$$

$P_{jam}$ is the probability that another node will want to transmit during the same transmission time and will not able to transmit because the one node will be transmitting the packet during that time. The probability may be estimated based on an average channel activity experienced by a transmitting node. The $P_{jam}$ probability can, for example, be estimated by the transmitting node "listening" to communications of other nodes. A logarithmic version of this equation is:

$$W = U \cdot 10^{\left(\frac{2/\alpha}{10} \cdot P\right)} \cdot P_{jam}$$

The interference energy W is used as a per-hop cost for route selection. For each possible route from the source node to the destination node, an interference energy route cost is determined by summing (or other type of suitable combining) the per-hop cost for each hop in that route. The route with the lowest interference energy cost is selected. Since the interference energy cost is a measure of the interfered area per time unit, such a selection will minimize the caused interference associated with packet transmission over that route and thereby increase the capacity of the wireless mesh network. In the case described above with IEEE 802.11 with the interference threshold being equal to the level where CCA is triggered, the interference energy is a relative measure of the number of nodes per second (the area times the number of nodes per m²) caused to wait for a desired transmission. By minimizing this "awaiting node seconds," the number of nodes that can transmit simultaneously on the shared frequency in the mesh network is maximized, and the total capacity in the mesh is then also maximized.

Each node may estimate the radio link quality for all other reachable nodes (i.e., within range) by directly measuring a communication quality of signals received from those other nodes, estimating radio communications quality conditions based on pilot or beacon signals transmitted by other nodes, and listening in on communications between other nodes that are within range. Each node also determines or estimates for each potential node hop communication a bit rate, a block error rate, and a transmission power.

The per-hop cost information may be maintained and distributed using different types of routing protocols, e.g., open shortest path first (OSPF) protocol and wireless routing protocol (WRP), where the per-hop cost is assigned using the caused interference energy W. In situations where the cost varies significantly depending on packet size, a per-hop cost for each packet size may be determined. In that situation, source-initiated on-demand routing protocols, like temporarily order routing algorithm (TORA), may be appropriate.

Figure 5:
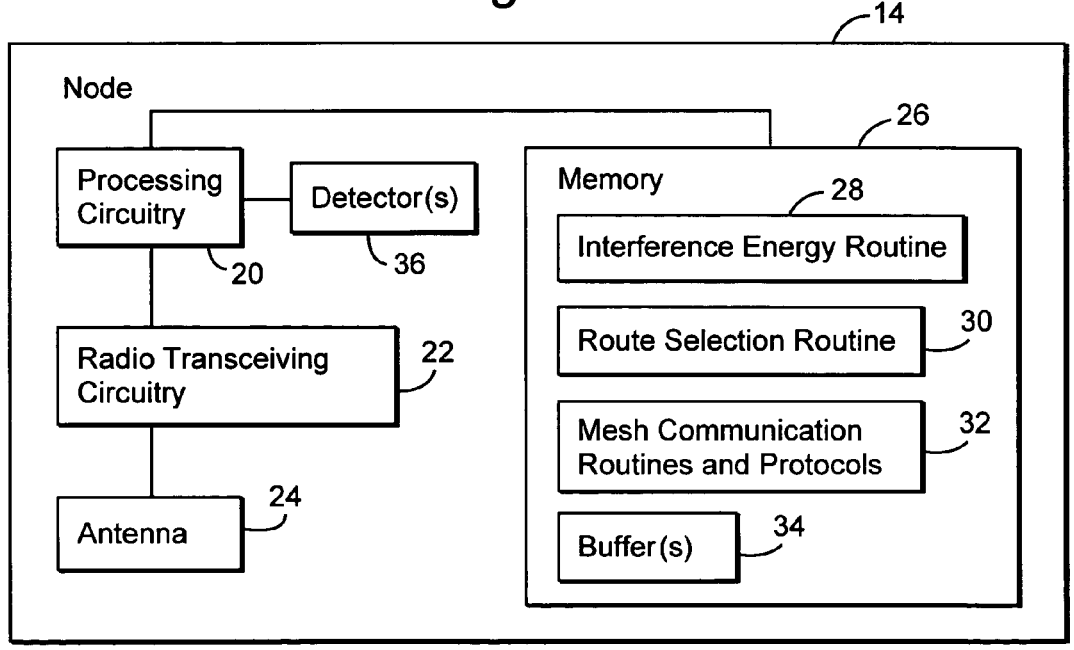
FIG. 5 is a function block diagram of an example wireless node.

Reference is now made to FIG. 5 which shows an example, non-limiting wireless mesh network node 14 in function block format. The wireless mesh network node 14 may be a stationary node or a mobile node. An example mobile node might be a portable telecommunications device such as a cellular telephone, a laptop personal computer with a wireless WLAN card, etc. The node 14 includes processing circuitry 20 coupled to radio transceiving circuitry 22, which is coupled to an antenna 24 such as an omni-directional or directional antenna. The processing circuitry 20 is also coupled to one or more detectors 36 for measuring one or more various radio link quality parameters used to determine transmission power, block error rate, bit rate, signal strength, etc. The processing circuitry 20 is also coupled to a memory 26 which includes an interference energy routine 28 executed by the processing circuitry 20 to determine the transmission time and the number of affected users in accordance with one of the equations above. Memory 26 also includes a route selection routine 30 which selects a best route based on the combination of hop interference energies in each possible route. Memory 26 stores mesh communication routines and protocols 32, e.g, WLAN IEEE 802.11. One or more buffers 34 are used to store packets to be transmitted and received over the mesh network.

Figure 6:
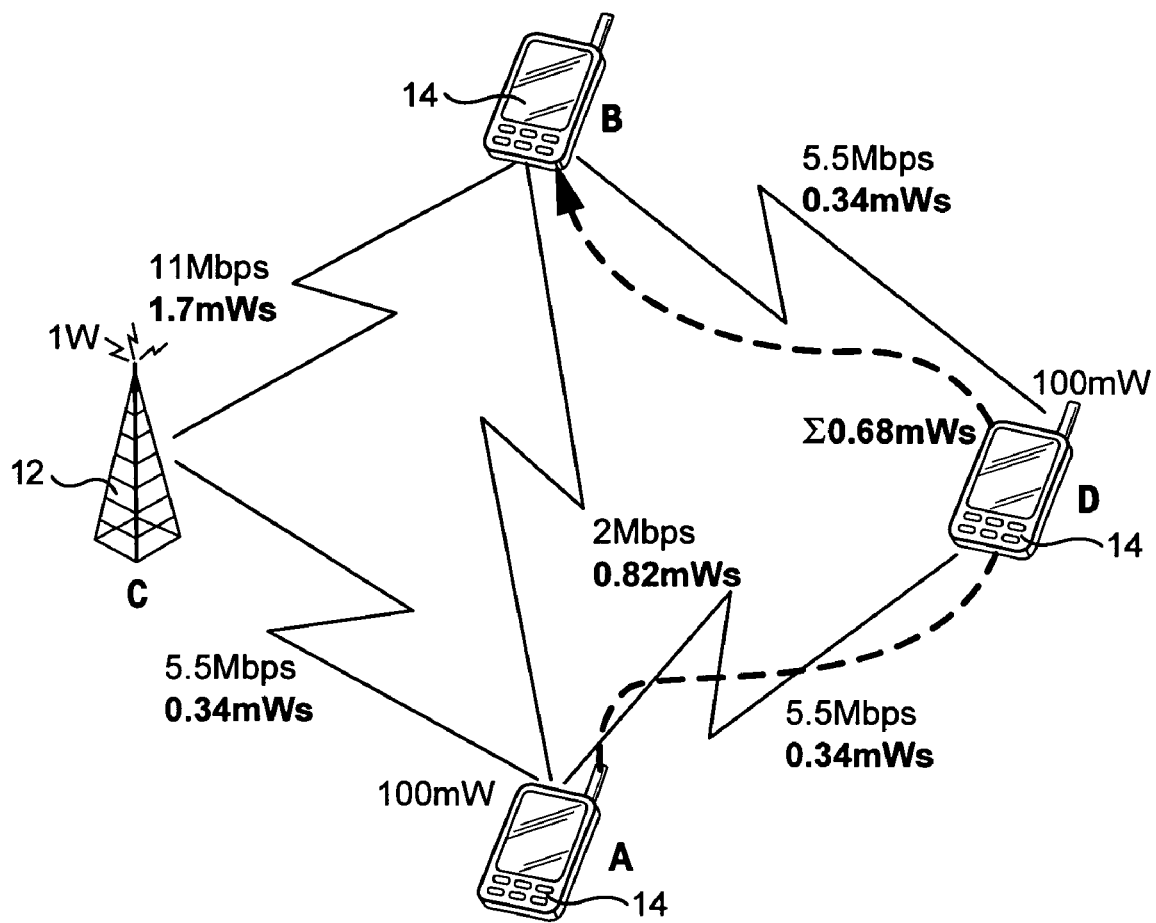
FIG. 6 illustrates a routing selection example in a simple wireless mesh network.

Consider a route selection example shown in FIG. 6. Assume that the wireless mesh network is a WLAN IEEE 802.11b mesh employed in an open office area, conference, or exhibition hall with a large number of nodes. In such a situation, the capacity of the shared radio resources must be carefully managed and hopefully maximized. Only a portion of that total mesh network is shown in FIG. 6 with four nodes including one access point 12 and three portable nodes 14. Assume that a packet is to be sent from node A to node B. There are three possible routes, each having two hops or less. The one hop route from node A directly to node B has the lowest bit rate of 2 Mbps because nodes A and B are separated by the farthest distance amongst the four nodes. The radio hop from the access point C to node B has the highest data rate of 11 Mbps because the access point C transmits with a much higher power than the mobile nodes—one Watt (W) as compared to 100 milliwatts (mWs) at which nodes A and D transmit. Each of the other hops has a data rate of 5.5 Mbps.

For an open office space area, the propagation constant α can be expected to be around 2.2. In Table 1 below, the interference energy W for all hops is calculated according to the equations above for two example packet sizes. The transmission time U is calculated assuming an IEEE 802.11 physical overhead taking into account media access control (MAC) acknowledgment/negative acknowledgments for prior transmissions over each hop.

TABLE 1

| | | | 1500 byte packet | | | 50 byte packet | | |
|---|---|---|---|---|---|---|---|---|
| Hop | P [dBW] | $10^{(\frac{2/\alpha}{10} \cdot P)}$ [W] | U [ms] | W [mWs] | ΣW [mWs] | U [ms] | W [mWs] | ΣW [mWs] |
| A->B | −10 | 0.12 | 6.8 | 0.82 | 0.82 | 1.0 | 0.12 | <u>0.12</u> |
| A->C | −10 | 0.12 | 2.8 | 0.34 | 2.04 | 0.7 | 0.09 | 0.79 |
| C->B | 0 | 1 | 1.7 | 1.7 | | 0.7 | 0.7 | |
| A->D | −10 | 0.12 | 2.8 | 0.34 | <u>0.68</u> | 0.7 | 0.09 | 0.18 |
| D->B | −10 | 0.12 | 2.8 | 0.34 | | 0.7 | 0.09 | |

For 1500 byte packets, the route from A to D to B generates the least interference energy corresponding to 0.68 mWs. But for a 50 byte packet, the direct path from node A to node B results in a least interference energy 0.12 mWs. If a shortest delay metric were used to select a route, this would result in the route through the access point node C (ACB) being selected. But assuming there are surrounding nodes sharing the radio spectrum, the high power transmission from node C would have occupied the common frequency resources in a much larger area because the interference level in that larger area would have been above a noise threshold, e.g., the carrier sense would have been triggered in the surrounding nodes. Indeed, compared to the interference energy of 0.12 over the longest route from A to B, route ACB generates eight times (i.e., 1/0.12=8.33) the amount of interference.

In another comparison, if a pure bandwidth cost were used to select the route, then the route ACB would be selected because it has the lowest bandwidth cost, 1/11+1/5.5. The second choice would be route ADB. But such a route selection approach does not take the packet overhead into account which can be particularly significant for smaller packets like the 50 byte size packet.

Route selection based on minimizing per-hop generate interference has a number of advantages including improving the capacity in a wireless mesh network, reducing battery consumption in portable battery-operated devices since lower transmission power is achieved, and reducing routing overhead in the mesh network. In addition, this route selection approach based on minimizing per-hop generate interference can be implemented within existing standards such as IEEE 802.11 and can be implemented with existing routing protocols such as OSFP, WRP, and TORA. Calculating the number of interfered users based on interfered area has the advantage that it is not necessary to obtain path gain measurements to all nodes within reach, which is costly when the node density is high.

Although various embodiments have been shown and described in detail, the claims are not limited to any particular embodiment. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method to select a route for a packet through a wireless mesh network between a source node and a destination node, comprising:

determining an interference energy associated with transmitting the packet over each node hop in multiple routes from the source node to the destination node;

combining the interference energy for each hop to produce a combined interference energy for each route; and selecting one of the routes based on the combined interference energy for each route, wherein determining the interference energy includes determining a transmission time associated with transmitting the packet over each hop in multiple routes from the source node to the destination node, and wherein the transmission time takes into account a size of the packet, an overhead associated with sending the packet, a bit rate associated with transmitting the packet over the hop that depends on current radio conditions for the hop, and a retransmission probability associated with transmitting over the hop.

2. The method in claim 1, wherein combining the interference energies includes summing the interference energies, and wherein the one route is selected having a lowest summed interference energy.

3. The method in claim 1, further comprising:

for each of the hops, determining a number of nodes that would be affected by interference associated with transmitting the packet over that hop;

combining the transmission time and the number of affected nodes for each hop to produce a corresponding hop result;

combining the hop results for each route; and selecting one of the routes based on the combined results.

4. The method in claim 3, wherein combining the transmission time and the number of nodes includes multiplying the transmission time and the number of nodes;

wherein combining the hop results includes summing the results, and wherein the one route is selected having a lowest summed result.

5. The method in claim 3, wherein the number of affected nodes is estimated based on a power level at which the packet would be transmitted over the hop and a propagation function that translates the power level to a caused interference to one or more surrounding nodes.

6. The method in claim 3, wherein the number of affected nodes is estimated based on a power level at which the packet would be transmitted over the hop, a receiver threshold at which the interference is affecting other nodes, and a propagation function that translates the power level to a caused interference to one or more surrounding nodes.

7. The method in claim 6, wherein the number of affected nodes is further based on a probability that nodes that are affected by interference also have data to transmit during the time they are interfered.

8. The method in claim 7, wherein the probability is estimated based on an average channel activity experienced by a transmitting node.

9. The method in claim 3, wherein the transmission time U is determined in accordance with the following:

$$U = \frac{D + OH_{L1}}{R_{L1} \cdot (1 - BLER)} \cdot N_{CH}$$

where D is a size of the packet, $OH_{L1}$ is an overhead associated with the packet transmission, $N_{CH}$ is a number of channels used for the transmission, $R_{L1}$ is a bit rate associated with transmitting the packet over the hop that depends on current radio conditions for the hop, and BLER is a block error probability estimate for the packet transmission.

10. The method in claim 3, wherein the number of affected nodes is estimated based in accordance with:

$$P^{2/\alpha}$$

wherein P is a power level at which the packet would be transmitted over the hop and $\alpha$ is a propagation factor that adjusts the power level to a caused interference to one or more surrounding nodes.

11. The method in claim 10, wherein the interference energy W for transferring the packet over one hop is determined in accordance with:

$$W = U \cdot P^{2/\alpha}.$$

12. The method in claim 10, wherein the interference energy W for transferring the packet over one hop is determined in accordance with:

$$W = U \cdot P^{2/\alpha} \cdot P_{Jam}$$

where $P_{Jam}$ is a probability that a node affected by interference also has data to transmit during the time when that node is interfered.

13. The method in claim 1, wherein information used to determine an interference energy associated with one or more hops is obtained from transmissions from other nodes.

14. The method in claim 13, wherein information used to determine an interference energy associated with one or more hops is obtained by the one node monitoring communications between other nodes.

15. The method in claim 1, further comprising:
distributing determined hop interference energies among the multiple nodes.

16. Apparatus for selecting a route for a packet through a wireless mesh network of nodes between a source node and a destination node, comprising electronic circuitry configured to:
determine an interference energy associated with transmitting the packet over each node hop in multiple routes from the source node to the destination node based on a transmission time associated with transmitting the packet over each hop in multiple routes from the source node to the destination node, where the transmission time takes into account a size of the packet, an overhead associated with sending the packet, a bit rate associated with transmitting the packet over the hop that depends on current radio conditions for the hop, and a retransmission probability associated with transmitting over the hop;
combine the interference energy for each hop to produce a combined interference energy for each route; and
select one of the routes based on the combined interference energy for each route.

17. The apparatus in claim 16, wherein the electronic circuitry is further configured to sum the interference energies and select the one route having a lowest summed interference energy.

18. The apparatus in claim 16, wherein the electronic circuitry is further configured to:
for each of the hops, determine a number of nodes that would be affected by interference associated with transmitting the packet over that hop;
combine the transmission time and the number of affected nodes for each hop to produce a corresponding hop result;
combine the hop results for each route; and
select one of the routes based on the combined results.

19. The apparatus in claim 18, wherein the electronic circuitry is further configured to multiply the transmission time and the number of nodes, sum the results, and select the one route having a lowest summed result.

20. The apparatus in claim 18, wherein the electronic circuitry is further configured to estimate the number of affected nodes based on a power level at which the packet would be transmitted over the hop and a propagation function that translates the power level to a caused interference to one or more surrounding nodes.

21. The apparatus in claim 18, wherein the electronic circuitry is further configured to estimate the number of affected nodes based on a power level at which the packet would be transmitted over the hop, a receiver threshold at which the interference is affecting other nodes and a propagation function that translates the power level to a caused interference to one or more surrounding nodes.

22. The apparatus in claim 21, wherein the number of affected nodes is further based on a probability that another node having data to transmit during the transmission time will actually be affected by the packet transmission.

23. The apparatus in claim 18, wherein the transmission time U is determined in accordance with the following:

$$U = \frac{D + OH_{L1}}{R_{L1} \cdot (1 - BLER)} \cdot N_{CH}$$

where D is a size of the packet, $OH_{L1}$ is an overhead associated with the packet transmission, $N_{CH}$ is a number of channels used for the transmission, $R_{L1}$ is a bit rate associated with transmitting the packet over the hop that depends on current radio conditions for the hop, and BLER is a block error probability estimate for the packet transmission.

24. The apparatus in claim 23, wherein the number of affected nodes is estimated based in accordance with:

$$P^{2/\alpha}$$

wherein P is a power level at which the packet would be transmitted over the hop and $\alpha$ is a propagation factor that adjusts the power level to a caused interference to one or more surrounding nodes.

25. The apparatus in claim 24, wherein the interference energy W for transferring the packet over one hop is determined in accordance with:

$$W = U \cdot P^{2/\alpha}.$$

26. The apparatus in claim 24, wherein the interference energy W for transferring the packet over one hop is determined in accordance with:

$$W = U \cdot P^{2/\alpha} \cdot P_{Jam}$$

where $P_{Jam}$ is a probability that one or more nodes having data to transmit during the transmission time will actually be affected by the packet transmission.

27. The apparatus in claim 16, wherein the electronic circuitry is configured to distribute determined hop interference energies among the multiple nodes.

28. The apparatus in claim 16, wherein the apparatus is implemented in each of the multiple nodes.

29. The apparatus in claim 16, wherein one of more of the nodes is a portable communications device.

* * * * *

UNITED STATES PATENT AND TRADEMARK OFFICE
CERTIFICATE OF CORRECTION

PATENT NO. : 7,554,998 B2
APPLICATION NO. : 11/032237
DATED : June 30, 2009
INVENTOR(S) : Simonsson et al.

It is certified that error appears in the above-identified patent and that said Letters Patent is hereby corrected as shown below:

On the Title Page, in item (73), under "Assignee", Line 2, delete "(CH)" and insert -- (SE) --, therefor.

In Column 6, Line 38, delete "$g_i$" and insert -- $g_1$ --, therefor.

In Column 9, Line 46, delete "OSFP," and insert -- OSPF, --, therefor.

Signed and Sealed this

Twenty-fourth Day of November, 2009

David J. Kappos
*Director of the United States Patent and Trademark Office*